United States Patent
Sahlin et al.

(10) Patent No.: US 10,237,792 B2
(45) Date of Patent: Mar. 19, 2019

(54) METHOD AND DEVICE FOR DETECTING A NUMBER OF USER TERMINALS

(71) Applicant: Telefonaktiebolaget LM Ericsson (publ), Stockholm (SE)

(72) Inventors: Henrik Sahlin, Mölnlycke (SE); Björn Johannisson, Kungsbacka (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 32 days.

(21) Appl. No.: 15/504,176

(22) PCT Filed: Aug. 18, 2014

(86) PCT No.: PCT/EP2014/067525
§ 371 (c)(1),
(2) Date: Feb. 15, 2017

(87) PCT Pub. No.: WO2016/026505
PCT Pub. Date: Feb. 25, 2016

(65) Prior Publication Data
US 2017/0265109 A1 Sep. 14, 2017

(51) Int. Cl.
*H04W 36/08* (2009.01)
*H04W 36/00* (2009.01)
(Continued)

(52) U.S. Cl.
CPC .......... *H04W 36/0083* (2013.01); *G07C 9/00* (2013.01); *G08G 1/012* (2013.01); *H04W 4/021* (2013.01);
(Continued)

(58) Field of Classification Search
CPC .......... H04W 36/0083; H04W 74/004; H04W 74/008; H04W 74/006; H04W 52/283; H04W 4/021; G08G 1/012; G07C 9/00
See application file for complete search history.

(56) References Cited

U.S. PATENT DOCUMENTS

| | | | |
|---|---|---|---|
| 2014/0194100 A1* | 7/2014 | Anchan | H04W 76/005 455/416 |
| 2014/0194124 A1* | 7/2014 | Xiao | H04W 36/0061 455/437 |

(Continued)

FOREIGN PATENT DOCUMENTS

| | | | | |
|---|---|---|---|---|
| EP | 2 693 807 A2 | 2/2014 | | |
| WO | 2009022837 A1 | 2/2009 | | |
| WO | WO-2015015136 A1 * | 2/2015 | ............ | H04W 4/005 |

OTHER PUBLICATIONS

International Search Report and Written Opinion issued in corresponding International Application No. PCT/EP2014/067525, dated Apr. 22, 2015, 9 pages.

(Continued)

*Primary Examiner* — Tejis Daya
(74) *Attorney, Agent, or Firm* — Rothwell, Figg, Ernst & Manbeck, p.c.

(57) ABSTRACT

The present invention relates to a method for detecting a number of user terminals (8a, 8b), each of said user terminals (8a, 8b) comprising a receiver unit (10), a transmitter unit (11) and a control unit (12) arranged to control said receiver unit (10) and transmitter unit (11), each of said user terminals (8a, 8b) also being associated with a wireless communication network (1) comprising a plurality of network cells (2, 3), each being equipped with a node (4, 5). The method comprises detecting (16) communication between each of said user terminals (8a, 8b) and an associated node (4; 5) of said wireless communication network (1). Furthermore, the method comprises: detecting (17) a first control message being transmitted from a user terminal (8a, 8b); detecting (18) a second control message being transmitted from a node (4; 5), said second control message being associated with the first control message; and increasing (19) a counter (15a) representing said number of user (Continued)

terminals (8a, 8b) based on detection of transmission of said control messages. The present invention also relates to a detector device (9) for detecting a number of user terminals (8a, 8b).

14 Claims, 5 Drawing Sheets

(51) Int. Cl.
  *H04W 4/021*   (2018.01)
  *H04W 4/04*   (2009.01)
  *G07C 9/00*   (2006.01)
  *G08G 1/01*   (2006.01)
  *H04W 52/28*   (2009.01)
  *H04W 74/00*   (2009.01)

(52) U.S. Cl.
  CPC ......... *H04W 4/046* (2013.01); *H04W 52/283* (2013.01); *H04W 74/004* (2013.01); *H04W 74/006* (2013.01); *H04W 74/008* (2013.01); *H04W 36/08* (2013.01)

(56) References Cited

U.S. PATENT DOCUMENTS

| | | | | |
|---|---|---|---|---|
| 2014/0244145 A1* | 8/2014 | Neel | ............... | G08G 1/042 701/117 |
| 2015/0257141 A1* | 9/2015 | Kulal | ............... | H04W 72/0406 370/329 |
| 2015/0296490 A1* | 10/2015 | Yi | ............... | H04L 1/1812 370/329 |
| 2016/0119762 A1* | 4/2016 | Zhu | ............... | H04W 76/28 370/312 |
| 2016/0119835 A1* | 4/2016 | Sun | ............... | H04W 16/32 455/444 |
| 2016/0157148 A1* | 6/2016 | Kato | ............... | H04W 36/0055 455/444 |
| 2016/0165378 A1* | 6/2016 | Harsha | ............... | H04W 4/005 370/329 |
| 2016/0219625 A1* | 7/2016 | Lee | ............... | H04W 74/0833 |

OTHER PUBLICATIONS

European Communication dated Jun. 19, 2018, issued in European Patent Application No. 14 755 628.6, 4 pages.

\* cited by examiner

METHOD AND DEVICE FOR DETECTING A NUMBER OF USER TERMINALS

CROSS REFERENCE TO RELATED APPLICATION(S)

This application is a 35 U.S.C. § 371 National Stage of International Patent Application No. PCT/EP2014/067525, filed Aug. 18, 2014, designating the United States, the disclosure of which is incorporated by reference.

TECHNICAL FIELD

The present disclosure relates to a method for detecting a number of user terminals, each of said user terminals comprising a receiver unit, a transmitter unit and a control unit arranged to control said receiver unit and transmitter unit, each of said user terminals also being associated with a wireless communication network comprising a plurality of network cells, each being equipped with a node. The method comprises detecting communication between each of said user terminals and an associated node of said wireless communication network.

The present disclosure also relates to a detector device for detecting a number of user terminals, each of said user terminals comprising a receiver unit, a transmitter unit and a control unit arranged to control said receiver unit and transmitter unit, each of said user terminals also being associated with a wireless communication network comprising a plurality of network cells, each being equipped with a node, said detector device further comprising a detector unit configured for detecting communication between each of said user terminals and an associated node of said wireless communication network.

BACKGROUND

In many fields of technology, for example transportation systems and road traffic planning, there is a desire to obtain information related to a number of individuals who are travelling along a specified route. Such information can be of assistance for example during design of public transportation systems, for dimensioning traffic routes and for coordinating bus and train schedules, and also for obtaining statistic information regarding trends and changes related to people's travel behavior. In particular, such information can be vital for planning and evaluating transport systems.

In particular, there is a need for reliable information related to the number of passengers travelling on vehicles such as buses and trains forming part of a public transportation system. In this manner, passenger traffic can be analyzed by counting the number of passengers travelling on different routes.

The above-mentioned problem can be solved manually by counting travelers on buses, trains and other means of public transportation. However, a manual method requires staff which is assigned to the task of actually counting the travellers. Consequently, such a method is expensive and complicated to implement.

Another solution to the above-mentioned problem is to utilize a mechanical turnstile which is arranged so that individuals can pass through. Every turn on the turnstile can then be registered as a count of a person passing. Such a solution is reliable but slow and ineffective, and also requires mechanical equipment in the form of such a turnstile. Another disadvantage is that the count of individuals may only occur at one single predetermined place, i.e. where the turnstile is located.

A further solution is to use suitable sensors for detecting passages of individuals, for example sensors based on infra-red technology. However, such a sensor-based solution is technically complex and difficult to implement. It also requires a relatively high amount of hardware, i.e. sensors, communication devices, evaluation and control units.

Yet another solution is to use video cameras which are connected to automatic image recognition systems, which in turn are arranged so as to count the number of passing persons. However, in some countries it can be expected that detection of individuals by means of video cameras can be considered as violating the personal integrity.

Consequently, in the relevant fields of technology there is a continuing need to provide simple, accurate and cost-effective solutions for detecting a number of individuals moving or travelling on a given route, either travelling in vehicles or by foot.

SUMMARY

It is an object of the disclosure to provide a method and system which seeks to reduce or eliminate the drawbacks in the art and to provide an improved method and system for detecting of a number of individuals travelling along a certain route.

This object is obtained by means of a method for detecting a number of user terminals, each of said user terminals comprising a receiver unit, a transmitter unit and a control unit arranged to control said receiver unit and transmitter unit, each of said user terminals also being associated with a wireless communication network comprising a plurality of network cells, each being equipped with a node. The method comprises detecting communication between each of said user terminals and an associated node of said wireless communication network. Furthermore, the method comprises: detecting a first control message being transmitted from a user terminal; detecting a second control message being transmitted from a node, said second control message being associated with the first control message; and increasing a counter representing said number of user terminals based on detection of transmission of said control messages.

According to an aspect, an advantage is obtained since the above-mentioned method constitutes a cost-effective way of collecting data which can be used for providing statistical information regarding the travelling behavior of a group of individuals. Furthermore, the method can be carried out generally with existing equipment which forms part of a wireless communication network, which makes the method easy to implement from a technical point of view. Also, the method is user-friendly since it does not require any active measures to be taken by the individuals being detected.

According to an aspect, the method further comprises detecting said control messages in the form of an indication of a handover of said user terminal from a first network cell to a second network cell. Such a method involves the use of control messages which are used for implementing a handover of a user terminal, which for example may occur when an individual using the user terminal travels from one network cell to an adjacent network cell. An advantage with this aspect is consequently that it uses detection of well-known control messages which are already implemented in today's wireless communication networks.

According to an aspect, the method comprises detecting said control messages in the form of an indication of completion of an initial access of said user terminal to a network cell. Such an initial access situation is consequently a further useful situation which involves control messages which can be detected.

Said object is also obtained by means of a detector device for detecting a number of user terminals, each of said user terminals comprising a receiver unit, a transmitter unit and a control unit arranged to control said receiver unit and transmitter unit, each of said user terminals also being associated with a wireless communication network comprising a plurality of network cells, each being equipped with a node. The detector device further comprises a detector unit configured for detecting communication between each of said user terminals and an associated node of said wireless communication network. Furthermore, the detector unit is configured for detecting a first control message being transmitted from a user terminal and for detecting a second control message being transmitted from a node, said second control message being associated with the first control message; wherein said detector device further comprises a counter unit representing said number of user terminals based on detection of a transmission of said control messages.

BRIEF DESCRIPTION OF THE DRAWINGS

Further objects, features, and advantages of the present disclosure will appear from the following detailed description, wherein certain aspects of the disclosure will be described in more detail with reference to the accompanying drawings, in which.

DETAILED DESCRIPTION

Different aspects of the present disclosure will be described more fully hereinafter with reference to the accompanying drawings. The method and apparatus disclosed herein can, however, be realized in many different forms and should not be construed as being limited to the aspects set forth herein.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Figure 1:
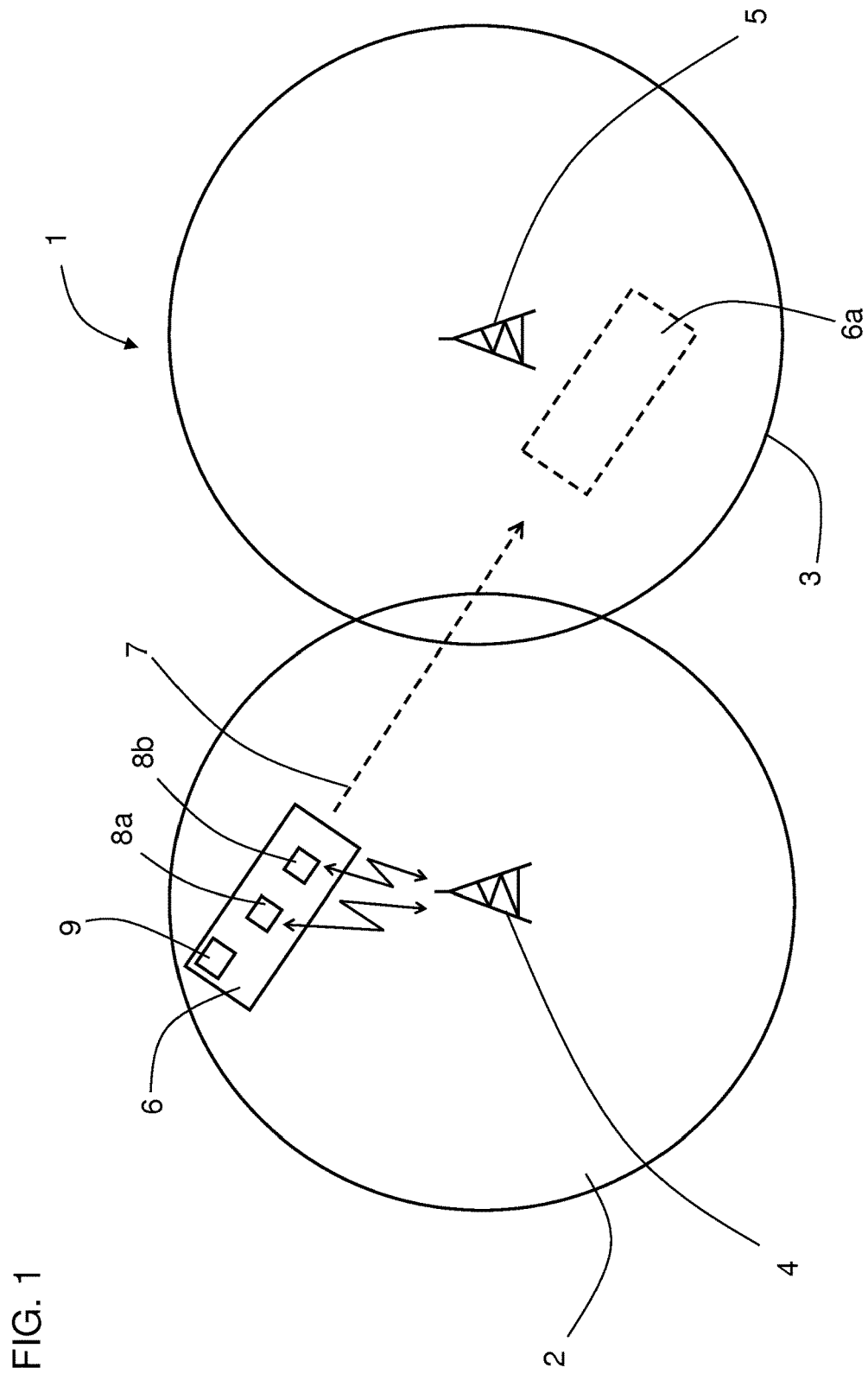
FIG. 1 schematically discloses a wireless communication network in which the invention can be used.

According to an aspect of the present disclosure, as shown schematically in FIG. 1, there is provided a wireless communication network 1 which comprises a first cell 2 and a second cell 3, each of which corresponds to a certain geographic cell area, as schematically indicated by means of circles in FIG. 1. The first cell 2 has a first node in the form of a first base station 4, i.e. comprising a first transceiver arrangement in the first cell 2. Also, the second cell 3 has a second node in the form of a second base station 5, i.e. comprising a second transceiver arrangement in the second cell 3.

According to known technology, a base station in a wireless communication network, such as the first node 4 or the second node 5 can be referred to as an "eNodeB". This is in accordance with the terminology used in the context of an LTE (Long-Term Evolution) radio-access network, also known as the Evolved Universal Terrestrial Radio-access Network (E-UTRAN). Each eNodeB is interconnected with each other by means of the X2 interface. The eNodeBs are also connected by means of the S1 interface to the EPC (Evolved Packet Core), more specifically to an MME (Mobility Management Entity) by means of the S1-MME and to a Serving Gateway (S-GW) by means of the S1-U.

In order to describe the purpose of this disclosure, it can be assumed that a vehicle 6 carrying a number of passengers is travelling in an area covered by the first cell 2. As a typical example, the vehicle 6 is constituted by a bus or a similar vehicle which forms part of a public transportation network. Furthermore, it can be assumed that virtually all of the passengers on the vehicle 6 carry a user terminal such as a mobile phone, a table computer or similar device. For reasons of simplicity, only two such user terminals 8a, 8b are shown in FIG. 1. The wireless communication network 1 is arranged to provide wireless communication services to these user terminals 8a, 8b, which are referred to as "user equipment" or "UE" in 3GPP ($3^{rd}$ Generation Partnership Project) terminology. The term "user terminal" will be used in the following in order to describe such devices. According to the disclosed aspect, the user terminals 8a, 8b are constituted by mobile units such as mobile telephones, wireless tablet computer or similar devices.

For the purpose of the present disclosure, it is assumed that there are only two user terminals 8a, 8b (carried by two different persons) on the vehicle 6. However, it is obvious that the number of user terminals may vary. As an example, it can be expected that the number of individuals which are travelling on a bus in a public transport system may be in the magnitude of 30-50. This means that there will be approximately the same number of user terminals on the bus.

In the context of this disclosure, the term "individual" (or "individuals") refers to physical persons. Today, it can be expected that virtually all persons carry a mobile device such as a mobile telephone or a tablet computer during for example travelling. This disclosure consequently relates to situations in which a certain number of individuals carry a user terminal during travelling.

Furthermore, FIG. 1 describes in a schematic manner that the vehicle 6 is travelling within the first cell 2 in a direction as indicated by means of an arrow 7. It is here assumed that the vehicle 6 is travelling from a first position, as indicated with continuous line, and further to a second position, as indicated with broken lines in FIG. 1. The second position of the vehicle 6 is indicated by means of reference numeral 6a. For the purpose of explaining this disclosure in greater detail, it is here assumed that the second position 6a is located within the second cell 3, i.e. which is served by the second node 5.

Since the user terminals 8a, 8b are initially located in the first cell 2, it can be assumed that they are connected to the mobile communication network 1 via the first node 4, as indicated schematically in FIG. 1. This means that the user terminals 8a, 8b may be used for wireless traffic, for example in the form of telephone calls or data communication, within the wireless communication network 1. According to what is previously known, each one of the two cells 2, 3 in the network 1 uses a separate set of frequencies in order to allow connections of user terminals with each cell 2, 3. In this manner, communication may be established generally without interference with neighboring cells. It is also known that when user terminals move from the first cell 2 to the second cell 3 during ongoing communication, switching from one cell frequency in the first cell 2 to a different cell frequency in the second cell 3 is done automatically while maintaining the connection. This is referred to as handover (or handoff). A typical handover situation occurs when a user terminal—which is in communication with a "source" node—moves to a new cell being associated with a "target" node. A new channel will then be selected for the user terminal which is associated with the "target" node. The user terminal will then be switched to the new channel while communication is still in progress.

Generally, an intra E-UTRAN handover process follows a set of steps in order to transfer a user terminal from a source node to a target node using the X2 protocol. For the purpose of this disclosure, it is assumed that the MME (Mobility Management Entity) and the Serving GW (Serving Gateway) are unchanged during the process. Furthermore, it is known as such that the handover procedure involves transmission of certain control messages in order to establish a switch from a source node to a target node. More precisely, such a control message is the Random Access Preamble, which is selected by the user terminal and transmitted to the target node. The target node may then send a response by transmitting a "Random Access Response" to the user terminal. The next transmission link with the target node may then be established so that the communication may proceed through the target node.

With reference initially to FIG. 1, a method will now be described for detecting a number of user terminals 8a, 8b which are associated with the wireless communication network 1, which comprises a number of network cells 2, 3, each having a node 4, 5, by detecting communication between the user terminals 8a, 8b and an associated node 4, 5. In particular, detection of certain control messages is used in order to verify communication involving a user terminal, for example during a handover process. In this way, by detecting such control messages, an indication of the presence of a user terminal can be obtained. More precisely, a first control message transmitted from the user terminal 8a and a second control message from a corresponding target node 5 are detected, wherein the first and second control messages are associated with each other in a manner such as the Random Access Preamble and the Random Access Response. These two messages are used during a handover procedure in order to verify the new connection with the target node.

A number of user terminals moving from one cell to another can be observed by detecting the occurrence of such control messages during handover for each user terminal. The number of user terminals being detected is furthermore an indication of the actual number of individuals travelling from one area to another while carrying their user terminals. The actual number of user terminals may not be exactly the same as the number of individuals (since some of the individuals may not carry any user terminal, or some user terminals may be switched off etc.), but the number of user terminals detected is a relatively precise measure of the number of individuals travelling as described above. This is due to the widespread use of mobile units such as mobile telephones, i.e. it can be expected that virtually every individual person carries their own mobile unit while travelling on the vehicle 6.

Figure 2:
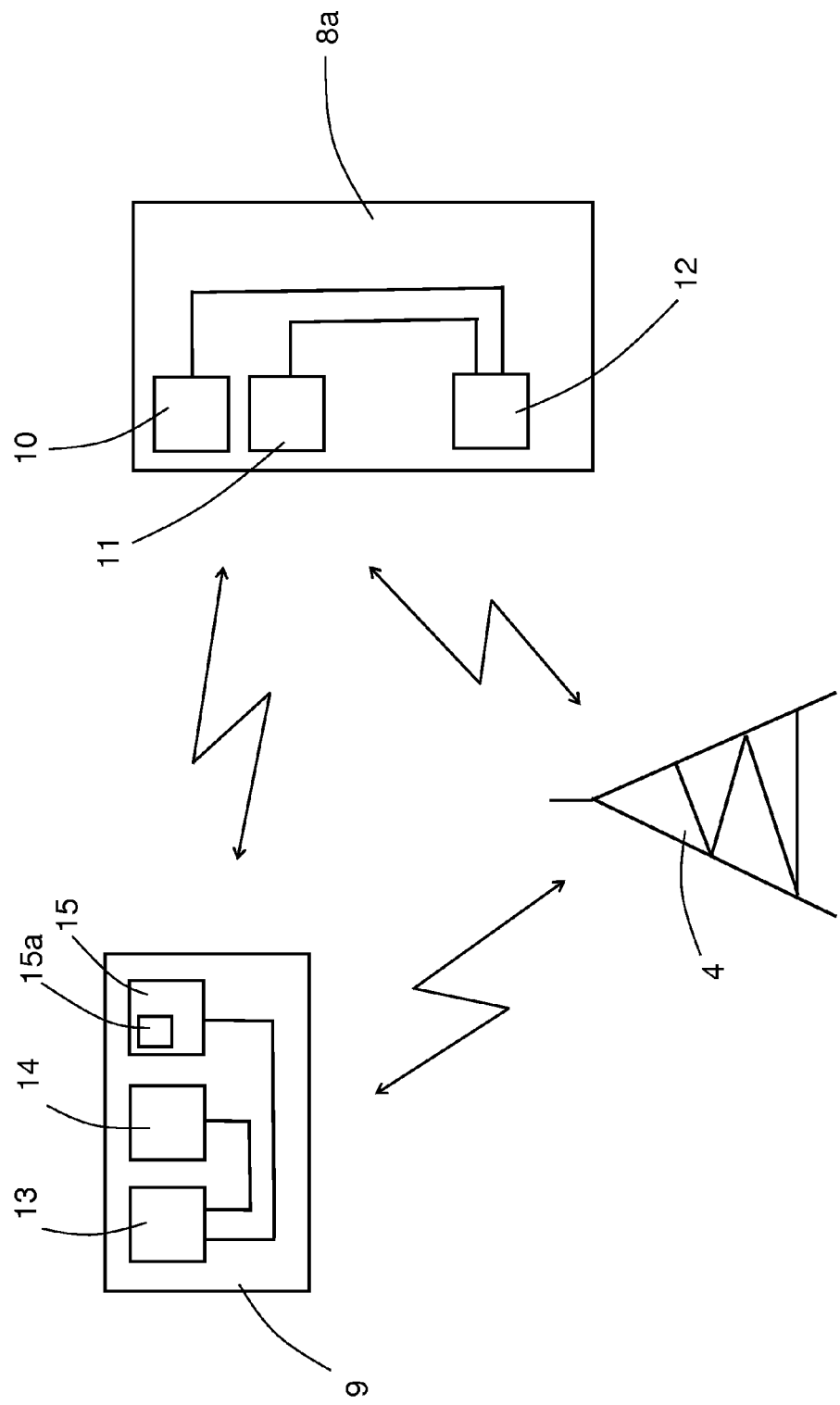
FIG. 2 schematically discloses a detector device and the communication between said detector device, a user terminal and said network.

A more detailed disclosure will now be provided with reference to FIG. 2 which shows a detector device 9 which can be used for detection of control messages. FIG. 2 shows a user terminal 8a and the first node 4. The communication between the detector device 9, the user terminal 8a and the node 4 will now be further described. It should be mentioned that the user terminal 8a comprises a receiver unit 10, a transmitter unit 11 and also a control unit 12 which is arranged to control said receiver unit 10 and transmitter unit 11. The detector device 9 comprises a detector unit 13, a transmitter unit 14 and a control unit 15 for controlling the detector unit 13 and the transmitter unit 14. The detector device 9 is arranged for detecting traffic both on the uplink frequency and on the downlink frequency in its associated cell. The control unit 15 also comprises a counter 15a which contains information related to a number of user terminals which have been detected as described above, i.e. by detecting a first control message from the user terminal 8a and then a second control message from a corresponding node 4. The user terminal 8a is arranged to communicate with the wireless communication network 1 in accordance with known principles based for example on the E-UTRAN architecture for radio access networks.

With reference to FIGS. 1 and 2, it should be noted that the detector device 9 is arranged so as to be carried by the vehicle 6. The detector device 9 will consequently be positioned sufficiently close to the user terminals 8a, 8b in order to detect the above-mentioned control messages being transmitted between the user terminals 8a, 8b and the relevant nodes 4, 5.

Figure 3:
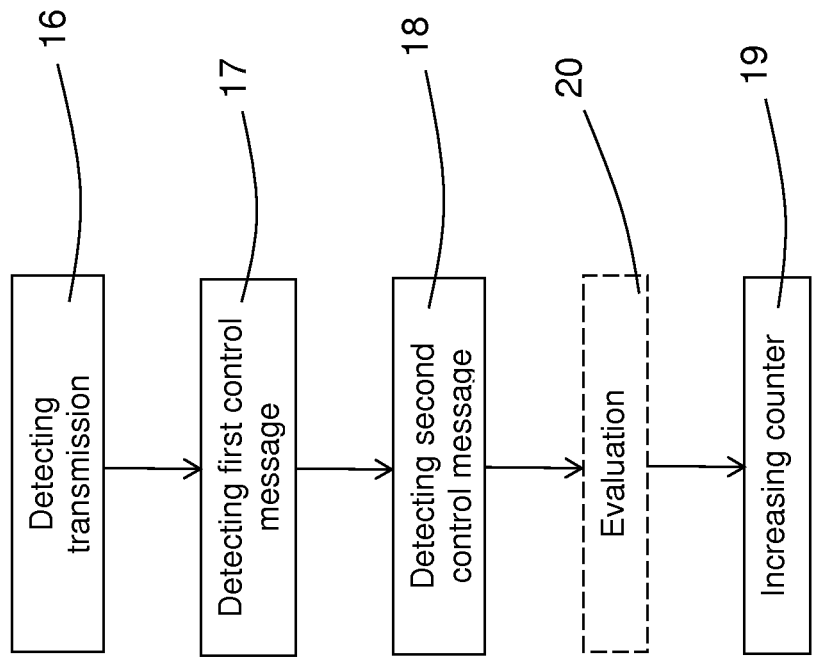
FIG. 3 is a flowchart showing the principles of the disclosure.

An aspect of the disclosure will now be described in the form of a flowchart which is shown in FIG. 3. As mentioned, the detector device 9 is configured for detecting transmission between the user terminals 8a, 8b (see FIG. 1) and the nodes 4, 5, i.e. for being in an active condition in which it may receive signals from the user terminals 8a, 8b. This corresponds to step 16 in FIG. 3. This also means that the detector device 9 will be configured to detect the above-mentioned control messages. It is here assumed that the user terminals 8a, 8b are active, i.e. that communication via data and/or voice is in progress and in communication with the first base station 4, as also shown in FIG. 1.

During a handover process, the detector device 9 will first detect a first control message in the form of a Random Access Preamble message (step 17) and then detect its response, i.e. the Random Access Response message (step 18). If these two control messages are received by the detector device 9, this will be an indication that the user terminal in question has gone through a handover process and that the user terminal has been switched from the first cell 2 to the second cell 3. This is also an indication that a particular individual who carries the user terminal has moved (by travelling on the vehicle 6) from the first cell 2 to the second cell 3.

When the detector device 9 has detected both control messages and as a consequence, the control unit 15 in the detector device 9 will increase the counter 15a which represents the number of detected user terminals 8a, 8b (step 19 in FIG. 3).

As a further optional step, the control unit 15 may be configured for a suitable form of evaluation of the detected control messages. This is indicated by means of reference numeral 20 in FIG. 3. Certain criteria can then be used for determining whether the counter 15a should be incremented. For example, the following criteria can be used:

1) The distance between the detector device 9 and a corresponding user terminals 8a can be determined by measuring the timing of the first control message. More precisely, the distance can be determined based on a propagation delay of a particular message transmitted from the user terminal 8*a* to the detector device 9. If the distance is less than a predetermined threshold value, for example 30 meters, it can be assumed that the user terminal in question is actually located on the vehicle 6.

2) The Doppler shift can be used to detect whether there is any relative movement between the detector device 9 and the corresponding user terminal 8*a*. If generally no such relative movement is detected, i.e. if it is determined that the user terminal 8*a* has a speed relative to the detector device 9 which is lower than a predetermined threshold value, it can be assumed that the user terminal 8*a* in question is located on the vehicle 6.

3) The power level of the user terminal 8*a* during communication with the node 4, which is also received by the detector device 9 can be detected. If the power level is higher than a predetermined threshold level, it is assumed that the user terminal 8*a* is located on the vehicle 6.

The above-mentioned criteria require measurements in the form of a distance, speed and power. These can be determined by from received signals from the user terminal. For example, the physical characteristics of the received "Random Access Preamble" can be used for calculating such measurements.

The evaluation process (step 20) can consequently be used in an optional manner to determine whether the counter 15*a* should be increased after receipt of the first and second control messages. The control unit 15 is used to analyze whether applicable criteria are fulfilled in order to initiate an increase of the counter 15*a*.

Figure 4:
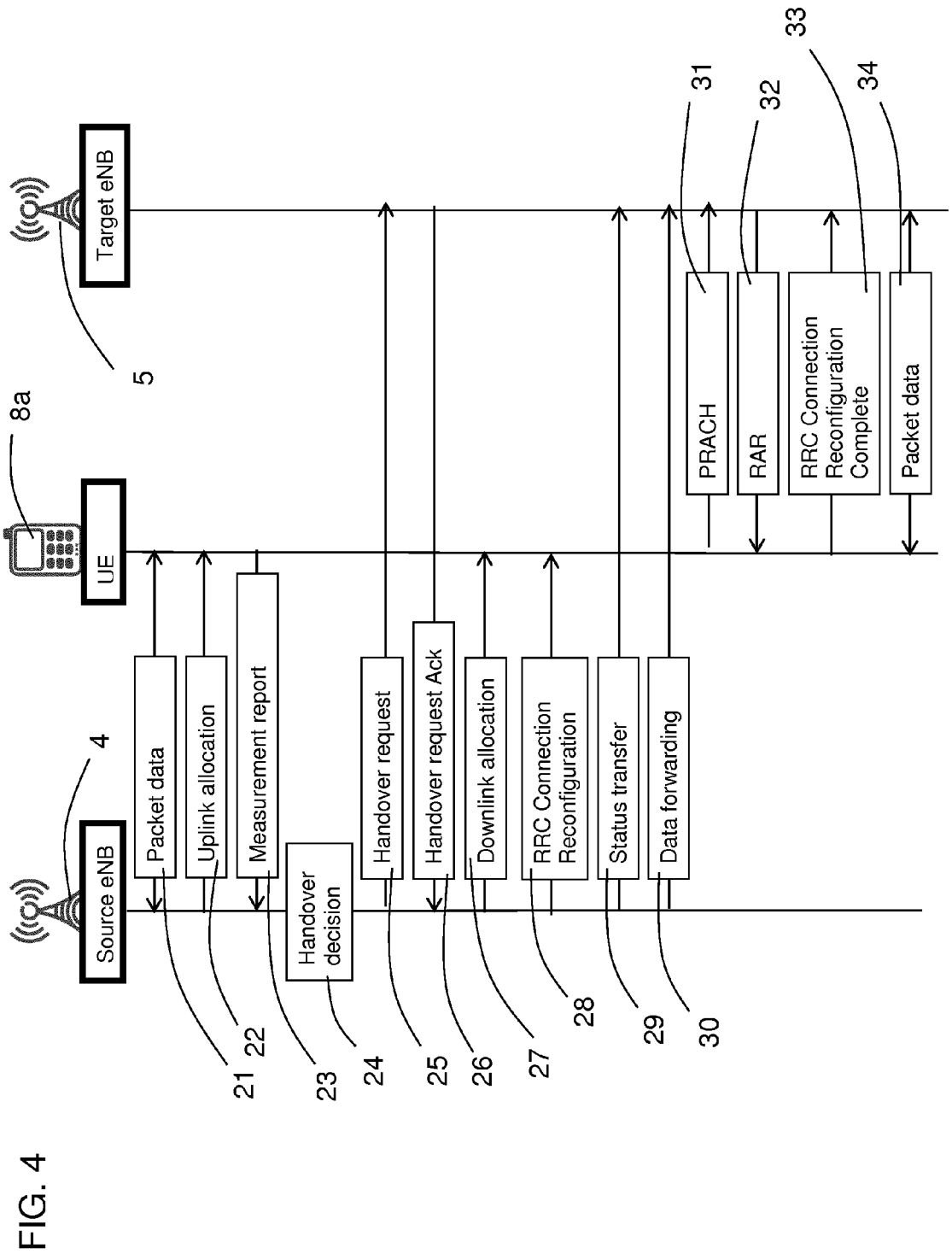
FIG. 4 is a flowchart showing the principles of an aspect of the disclosure.

A handover process will now be described more in detail with reference to FIG. 4, which is a flowchart involving a user terminal 8*a*, a first node 4 (i.e. a "source" node) and a second node 5 (a "target" node). The user terminal 8*a* is connected to the first node 4, i.e. there is communication in progress between the user terminal 8*a* and the first node 4. This is indicated by means of a step for transmitting packet data (step 21 in FIG. 4) between the source node 4 and the user terminal 8*a*. Furthermore, uplink allocation of transmission resources is provided by the first node 4 (step 22). Next, the user terminal 8*a* sends a measurement report 23 involving, for example, data indicating that the conditions for handover are fulfilled (step 23). The next step is that the first node 4 makes a handover decision, based on the measurement report, to initiate a handover (step 24) and then issues a handover request message to the second node 5 (step 25) in order to prepare said second node 5 for the handover. The second node 5 then configures the required resources and replies by sending a handover request acknowledge message (step 26).

A downlink allocation message is sent to the user terminal 8*a* (step 27) and also a RRC Connection Reconfiguration message (step 28), in order to establish radio bearers, transfer configuration information and prepare for the actual handover. Furthermore, a Status Transfer message is sent from the source node 4 (step 29) to the target node 5 to convey receiver and transmitter status information. A Data Forwarding step is also carried out (step 30) involving configuration information transmitted from the source node 4 to the target node 5.

The next step in the process is that the user terminal 8*a* sends a request to be synchronized with the network via the target node 5 (step 31). Such a request is carried out via a channel referred to as PRACH (Physical Random Access Channel). A request is sent in the form of a Radio Access Preamble. There are 64 preambles available, numbered with a preamble index between 1 and 64, and one of these preamble indices is chosen. For a handover, this choice of preamble index is included in the RRC Connection Reconfiguration (step 28) which is sent from the source node 4 to the user terminal 8*a*. Next, the target node 5 calculates a timing advance (in order to configure future communication from the user terminal 8*a* to the node with correct timing) and sends a Random Access Response to the user terminal 8*a* (step 32). In the LTE architecture, the Random Access Response is carried by the Physical Downlink Shared Channel (PDSCH). This Random Access Response contains, among other information, the detected preamble index and the estimated timing advance. The user terminal 8*a* responds by sending a RRC Connection Reconfiguration Complete message (step 33) in order to confirm the handover to the target node 5. Finally, packet data can be sent between the user terminal 8*a* and the target node 5 (step 34).

As mentioned above, the detector device 9 (see FIGS. 1 and 2) is configured for detecting both the Random Access Preamble and Random Access Response messages and for increasing the counter 15*a* based on receipt of these messages.

According to a further aspect of this disclosure, the detector unit 9 is configured for detecting control messages related to a process in which a user terminal 8*a* obtains initial access to the wireless communication network. Such a situation may occur for example when the user terminal 8*a* is switched on or when reception is restored after being in a certain area without any connection. This aspect of the disclosure is also based on a method in which a first control message from the user terminal 8*a* and a second control message from a corresponding node 4 are detected, and also wherein the counter 15*a* representing a number of user terminals is increased based on detection of said control messages.

A flowchart of such an initial access procedure will now be described with reference to FIG. 5. Firstly, it is noted that Primary Synchronization Signal, PSS, is regularly transmitted from the node 4 (step 35 in FIG. 5). This signal carries information related to the relevant physical cell id and is also used for synchronization of user terminal 8*a*. Furthermore, the node 4 also transmits the Second Synchronization Signal, SSS (step 36), which allows the user terminal 8*a* to obtain the physical cell identity. Next, the node 4 transmits system information on a Physical Broadcast Channel, PBCH (step 37).

In a manner which is similar to has been explained with reference to FIG. 4, the user terminal 8*a* will send a Random Access Preamble message on the Physical Random Access Channel (step 38). This control message is chosen as one out of 64 preamble index. The preamble to transmit is chosen randomly as a preamble index within the user terminal 8*a*. The node 4 will respond by transmitting its Random Access Response (step 39), including timing adjustment information, detected preamble index and similar system information. This message is sent on the Physical Downlink Shared Channel. Furthermore, the user terminal 8*a* sends identity information in order to confirm the RRC connection on the Physical Uplink Shared Channel, PUSCH (step 40).

Figure 5:
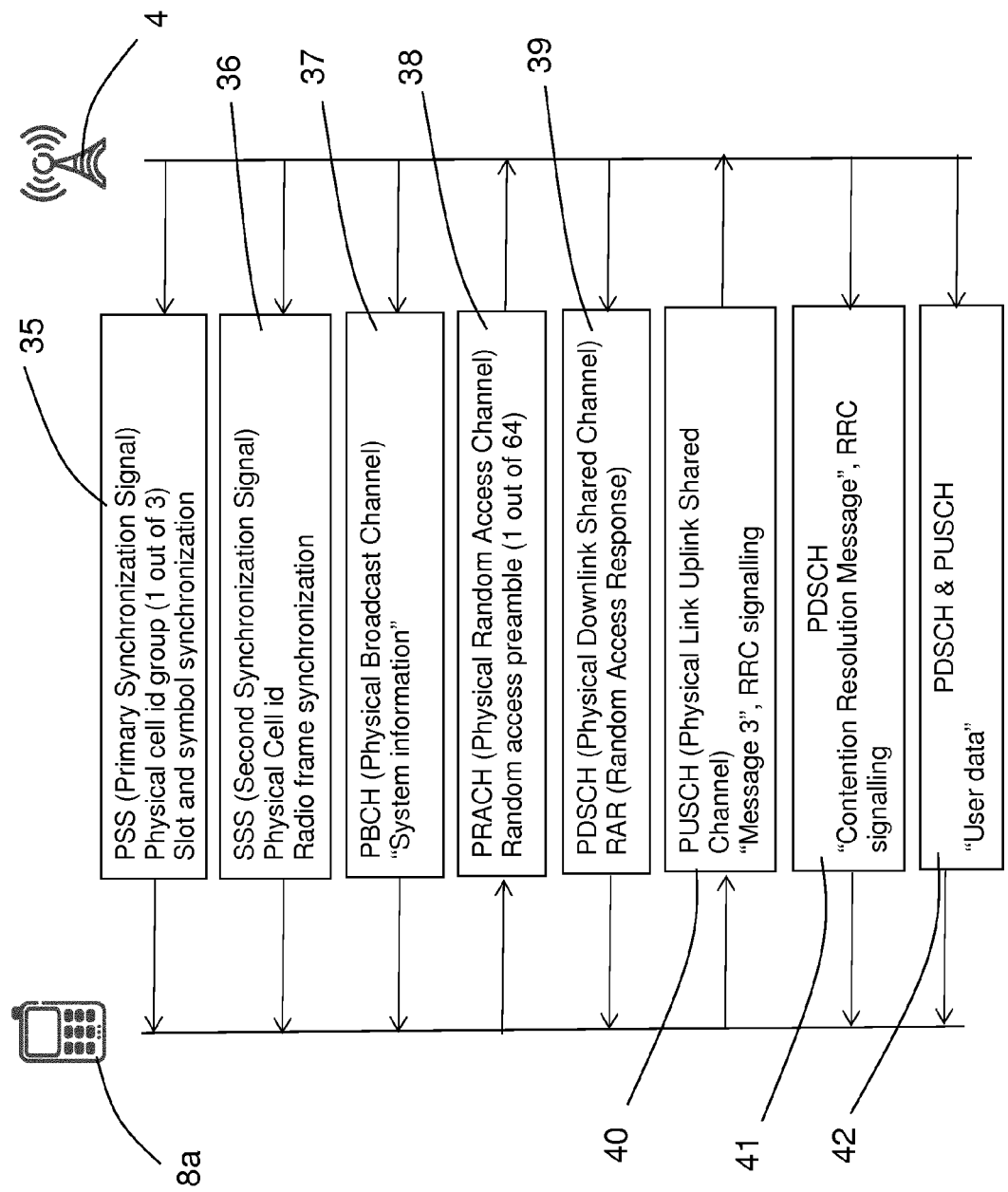
FIG. 5 is a flowchart showing the principles of a further aspect of the invention.

FIG. 5 describes an access procedure involving possible contention resolution, i.e. a procedure in which more than one user terminal requests the same resources via their Random Access Preamble messages, and the node 5 sends a Contention Resolution Message on the Physical Downlink Shared Channel, PDSCH (step 41). Finally, user data is transmitted on the Physical Downlink Shared Channel, PDSCH, and the Physical Uplink Shared Channel, PUSCH (step 42).

The aspect shown in FIG. 5 is based on the concept that control messages in the form of the Random Access Preamble (step 38) and the Random Access Response (step 39) are detected and used for increasing the counter 15a in the control unit 9 shown in FIG. 2.

The disclosure has now been explained with reference to situations involving detection of control messages which occur during initial access and during handover. The purpose of the method and device described is to provide a means of registering the number of user terminals 8a, 8b carried by the vehicle 6, which number generally corresponds to the number of individuals which are travelling with said vehicle 6. The information which is obtained as described can be used in a number of ways, for example as a measure of the number of passengers on certain vehicles along particular routes. Such information can be of use during planning of traffic routes, allocation of public transport vehicles etc. Such information can also be of use in a general manner for studying patterns of travelling of a certain group of persons.

It should be noted that the detector device 9 comprises a transmitter unit 14 in order to communicate with the wireless communication network 1, so as to be able to deliver the acquired information to clients and involved parties.

The specific details provided in the above description are provided as examples only in order to provide a better understanding of the present invention. Several alternative aspects of the disclosure above can also be implemented. For example, the detector device 9 can be positioned on a travelling vehicle as explained above. Alternatively, it can be placed in a fixed position and be arranged for detecting a number of user terminals which are passing by said detector device.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method for determining a number of user terminals located within a vehicle, the method comprising:

receiving, at a detector unit located in or on the vehicle, a first control message transmitted by a user terminal to a base station serving a cell in which the vehicle is located, wherein the base station is located away from the vehicle;

receiving, at the detector unit, a second control message transmitted by the base station;

determining, by the detector unit, that the second control message is associated with the first control message; and increasing, by the detector unit, a counter representing said number of user terminals located within the vehicle based on the reception of said first and second control messages.

2. The method of claim 1, wherein
the method further comprises determining whether the user terminal is located within the vehicle, and
the step of increasing the counter based on the reception of the first and second control messages comprises increasing the counter as a result of determining that a) the second control message is associated with the first control message and b) the user terminal is located within the vehicle.

3. The method of claim 1, wherein:
the first control message comprises a random access preamble; and
the second control message is a message transmitted by the base station in response to the random access preamble.

4. The method of claim 2, wherein
determining whether the user terminal is located within the vehicle comprises at least one of the following determinations:
i) determining whether the distance between the user terminal and the detector unit is less than a threshold distance,
ii) determining whether the difference between the speed of the user terminal and the speed of the detector unit is less than a threshold speed,
iii) determining whether a power level of the user terminal is above a power threshold.

5. The method of claim 2, wherein
determining whether the user terminal is located within the vehicle comprises:
determining whether the difference between the speed of the user terminal and the speed of the detector unit is less than a threshold speed, or
determining whether a power level of the user terminal is above a power threshold.

6. The method of claim 1, wherein
the method further comprises using the counter to determine and estimate of the number of individuals located within the vehicle.

7. The method of claim 1, wherein said method further comprises:
evaluating whether said counter should be increased, based on parameters related to said first and second control messages or to said user terminal.

8. The method of claim 7, wherein said method further comprises:
increasing the counter based on whether at least one of the following criteria is fulfilled:
said user terminal is within a predetermined distance from said detector device;
said user terminal is having a speed relative to the detector device which is lower than a predetermined speed threshold value; and said user terminal is transmitting at a power level which is above a predetermined power threshold value.

9. A vehicle, comprising:
a detector device for detecting a number of user terminals located within the vehicle while the vehicle is moving, said detector device comprising:
a memory; and
processing circuitry coupled to the memory, wherein the processing circuitry is configured to:
obtain a first control message transmitted by a user terminal to a base station serving a cell in which the vehicle is located, wherein the processing circuitry is located in or on the vehicle and the base station is located away from the vehicle;
obtain a second control message transmitted by the base station, said second control message being associated with the first control message; and
increase a counter representing said number of user terminals located within the vehicle based on the detection of said first and second control messages.

10. The vehicle of claim 9, wherein the first control message comprises a random access preamble and the second control message is transmitted by the base station in response to the random access preamble.

11. The detector device of claim 9, wherein the processing circuitry is further configured to determining whether the user terminal is located within the vehicle, and
the processing circuitry is configured to increase the counter as a result of determining that a) the second control message is associated with the first control message and b) the user terminal is located within the vehicle.

12. A control unit for detecting a plurality of user terminals associated with a wireless communication network, said control unit being configured to perform the steps of the method of claim 1.

13. The method of claim 1, further comprising
the detector unit determining, based on the first control message, whether the user terminal is located within the vehicle, wherein the detector unit increases the counter as a result of determining that the user terminal is located within the vehicle and receiving the second control message.

14. An apparatus, comprising:
a receiver;
a memory; and
processing circuitry coupled to the receiver and the memory, wherein the processing circuitry is configured to:
determine whether the receiver has received a first control message transmitted by a user terminal to a base station serving a cell;
determine whether the receiver has received a second control message transmitted by the base station;
determine whether the second control message is associated with the first control message;
determine whether the user terminal is located within a vehicle, and
increase a counter as a result of determining that: a) the second control message is associated with the first control message and b) the user terminal is located within the vehicle.

* * * * *

UNITED STATES PATENT AND TRADEMARK OFFICE
CERTIFICATE OF CORRECTION

PATENT NO. : 10,237,792 B2
APPLICATION NO. : 15/504176
DATED : March 19, 2019
INVENTOR(S) : Sahlin et al.

Page 1 of 1

It is certified that error appears in the above-identified patent and that said Letters Patent is hereby corrected as shown below:

On the Title Page

Item (57), under "ABSTRACT", in Column 2, Line 11, delete "(4;5)" and insert -- (4,5) --, therefor.

Item (57), under "ABSTRACT", in Column 2, Line 15, delete "(4;5)," and insert -- (4,5), --, therefor.

In the Specification

In Column 4, Line 20, delete "table computer" and insert -- tablet computer --, therefor.

Signed and Sealed this
Twentieth Day of August, 2019

Andrei Iancu
*Director of the United States Patent and Trademark Office*